Nov. 15, 1960   K. E. WILSON   2,960,109
FLOW REGULATOR
Filed Jan. 7, 1957
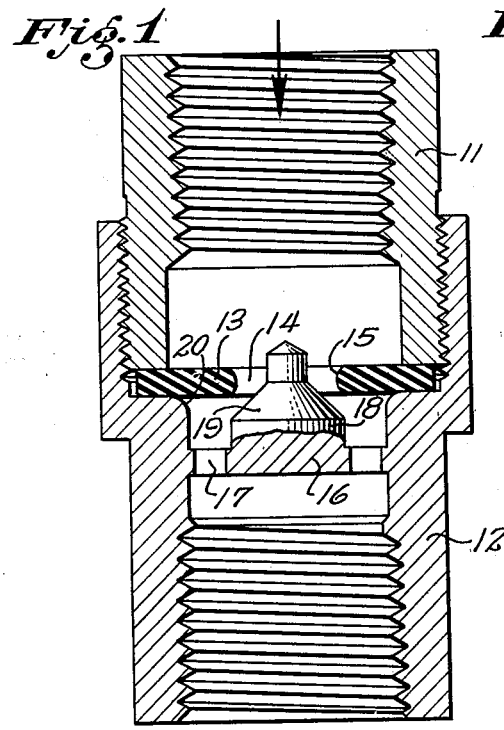
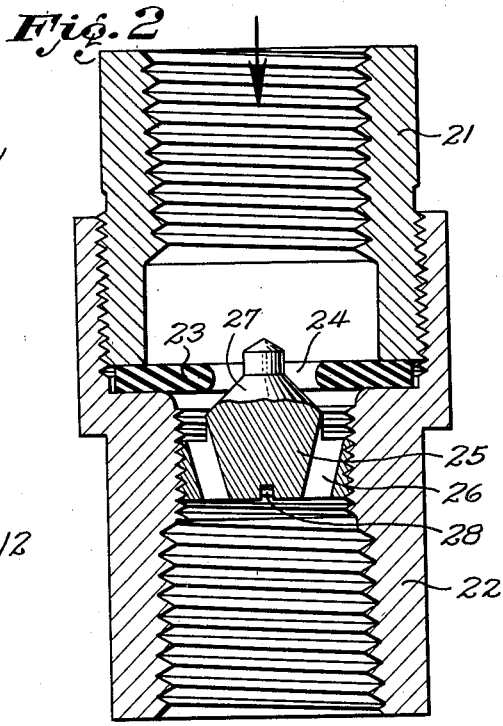
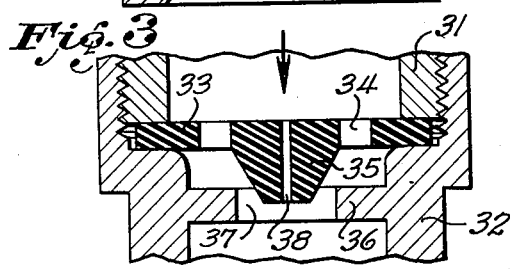
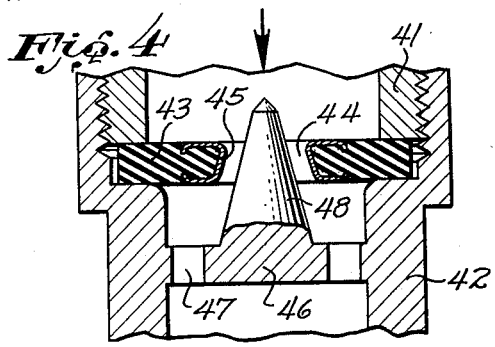
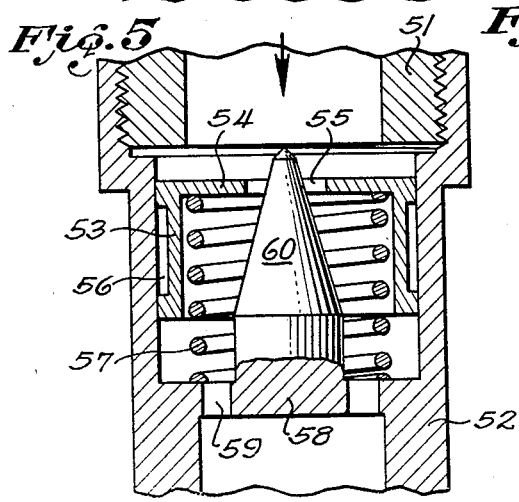
INVENTOR,
KEITH E. WILSON
BY
John H. Rouse,
ATTORNEY United States Patent Office 2,960,109
Patented Nov. 15, 1960

2,960,109

FLOW REGULATOR

Keith E. Wilson, Burbank, Calif., assignor to General Controls Co., Glendale, Calif., a corporation of California Filed Jan. 7, 1957, Ser. No. 632,814

2 Claims. (Cl. 137—517)

This invention relates to devices for maintaining the normal rate of flow of fluid through a conduit substantially constant despite variation of the pressure of the fluid supplied to it.

A main object of this invention is to provide a device of the character described that is simple in construction, yet sensitive and accurate in operation.

Another object of the invention is to provide a flow regulator wherein the regulating action is produced by flexure of a member of elastomer material; an ancillary object being to provide means for adjusting the action of such a regulator.

While not so limited, the devices of this invention have particular utility for controlling the flow of liquids; a typical use being for maintaining constant the rate of flow of water to apparatus, such as a washing machine, that is time-controlled so that the amount of water supplied to the apparatus is different if the pressure of the source changes.

Further objects and advantages of this invention will become apparent from the following description and accompanying drawing, and from the appended claims.

In the drawing:

Figure 1 is a sectional view of a flow regulator embodying this invention;

Figure 2 is a similar view of a modified form of flow regulator according to the invention; and Figures 3 to 5 are fragmentary sectional views of other modified forms of flow regulators according to the invention.

The flow regulator shown in Fig. 1 comprises a casing formed by two hollow sections 11 and 12 threaded together, each section being internally threaded at its outer end for connecting the casing in a fluid conveying system. The upper section 11 is simply tubular and, as is indicated by the flow arrow, forms the inlet of the regulator. Clamped at its margin between the inner end of the upper section and a cooperating shoulder formed in the lower section 12 is a disk 13 of elastomer material, such as synthetic rubber, having a circular central opening 14. Both edges of the wall of opening 14 are rounded as indicated at 15.

The lower casing-section 12 has a transverse wall 16, provided with a plurality of openings 17, from which wall a member 18 projects upwardly into the opening 14 in spaced relation to its side wall so that there is an annular space for flow between these parts. The median portion 19 of member 18 is conical so that when fluid flows through the casing, and the free inner portion of the elastomer disk 13 consequently flexes downwardly under the pressure of the fluid, the area of the annular space between the conical portion 19 and the wall of opening 14 is reduced to a size sufficient to permit the fluid to flow at normal rate. The dimensions and elasticity of disk 13, as well as the slope of the surface 19 and its normal position relative to the disk-opening 14, are arranged so that the rate of flow of a given fluid through the casing is maintained substantially constant, with normal variation of the inlet pressure, by the variation of area of the annular space caused by flexure of the elastomer disk in response to the pressure variations. The surface 19 need not be conical as shown but may have, for example, a logarithmic curve to suit particular conditions. Because of the rounded edges 15 of opening 14 the effective size of this opening does not vary significantly with varying degree of flexure of the disk 13. To facilitate flexure of the disk, the edge of the shoulder of the casing on which the disk rests is rounded as indicated at 20.

The flow regulator shown in Fig. 2 comprises upper and lower casing-sections 21, 22 between which is clamped the margin of an elastomer disk 23 having a central opening 24 with which a member 25, mounted in the lower section, cooperates, the member having flow passages 26 therethrough and a conical portion 27 projecting into the disk-opening 24. The only real difference between this regulator and the one shown in Fig. 1 is that in Fig. 2 the member 25 is threadedly mounted in the casing and is provided with a slot 28 for a screwdriver by means of which the position of the member relative to the disk-opening can be adjusted to meet different flow conditions or to compensate for production differences. It is to be understood that the other forms of the invention shown in Figs. 3–5 may be made adjustable in a similar manner.

In Fig. 3, the regulator comprises upper and lower casing-sections 31, 32 (shown only fragmentarily) between which is clamped, by its margin, an elastomer disk 33 having a plurality of openings 34 therethrough and, on its underside, a central conical boss 35 projecting into an opening 37 through a transverse wall 36 formed integrally with the lower casing-section. In this arrangement, flexure of the elastomer disk in response to variation of inlet pressure effects change of position of the conical boss 35 relative to opening 37 such as to compensate for the variation of pressure. In the event of surge of inlet pressure sufficient to bring the boss 35 into seating engagement with the edges of opening 37, the boss would normally then be maintained in that position under the inlet pressure. To prevent the possibility of such occurrence, a pressure-equalizing passage 38 is provided through the disk and boss. If desired, a similar bypass may be provided in the regulators shown in the other figures. While the conical boss is shown as being integral with disk 33, it could be of other material and attached to the disk in any suitable manner.

The flow regulator of Fig. 4 comprises upper and lower casing-sections 41, 42 between which is clamped, by its margin, an elastomer disk 43 having a central opening 44 whose wall is lined by a metallic eyelet 45 preferably molded in the elastomer material. Integral with the lower casing-section is a transverse wall 46 having a plurality of openings 47 therethrough, and on its top a conical member 48 projecting into the opening 44. In this arrangement the disk 43 is relatively thick so that its operative movements are smaller, the slope of the conical member and of the wall of opening 44 being conformingly modified.

In the regulator of Fig. 5 the lower casing-section 52 is bored to form a cylinder for a hollow metallic or plastic piston 53 whose top wall 54 is provided with a central opening 55. To reduce friction, the piston is relieved at its periphery as indicated at 56. The piston is supported by a spring 57 resting on a transverse wall 58 below it, the normal position of the piston being determined by the free length of this spring. The casing-wall 58 has a plurality of openings 59 therethrough, and on its top a conical member 60 projecting into the opening 55 in the top wall of the piston. The operation of this regulator is generally the same as that of the one shown in Fig. 4. The resultant of the fluid pressure and spring force acting on the piston determines its operative position and hence the effective area of opening 55 necessary to maintain a constant rate of flow with varying inlet pressure. This form of regulator may be employed in connection with fluids that would affect elastomer materials adversely.

By employing elastomer disks that are relatively thinner and/or of larger diameter than those shown in Figs. 1-4, devices adapted for regulating the flow of gaseous fluids may be constructed according to this invention.

The specific embodiments of my invention herein shown and described are obviously susceptible of modification without departing from the spirit of the invention, and I intend therefore that no limitation be placed on the invention except as defined by the scope of the appended claims.

I claim as my invention:

1. In a flow regulator: a first casing part having a through bore enlarged at one end to form a shoulder intermediate the length of said first casing part; a circular member of flexible resilient material fitted in said one casing part with its marginal portion against said shoulder; said member having flow openings located non-centrally thereof; a second casing part having one end threadedly receivable in the said one end of said first casing part and frictionally clamping the marginal portion of said member against said shoulder; the other ends of both of said casing parts having provisions for threadedly inserting the connected casing parts into a fluid conduit; said one casing part having a wall located between the shoulder and said other end of said first casing part; said wall having a central opening therein through which fluid flowing through the casing parts must pass; said flexible resilient member having a generally conical projection located centrally on that side of said member facing said wall, and substantially aligned with and converging toward said wall opening; said projection forming with said wall opening an annular flow space the effective area of which diminishes upon flexure of said member toward said wall whereby the rate of flow of fluid through the casing parts is maintained substantially constant despite pressure variations; said shoulder of said first casing part being rounded at its inner edge to facilitate flexure of said member toward said wall opening.

2. The combination as set forth in claim 1 in which said flexible resilient member and said projection provide passage means for restricted passage of fluid on opposite sides of said member and circumscribed by the conical periphery of said projection whereby surges in pressure will be ineffective to maintain the projection seated against said wall opening.

References Cited in the file of this patent

UNITED STATES PATENTS

| | | |
|---|---|---|
| 2,367,106 | Dolch | Jan. 9, 1945 |
| 2,462,189 | Hess | Feb. 22, 1949 |
| 2,517,083 | Carlson | Aug. 1, 1950 |
| 2,674,262 | Bradshaw | Apr. 6, 1954 |
| 2,684,081 | Chace | July 20, 1954 |
| 2,772,833 | Chace | Dec. 4, 1956 |
| 2,781,061 | Frey | Feb. 12, 1957 |
| 2,815,041 | Rimsha | Dec. 3, 1957 |